R. SINCLAIR, Jr.
Straw Cutter.
No. 20,958. Patented July 20, 1858.
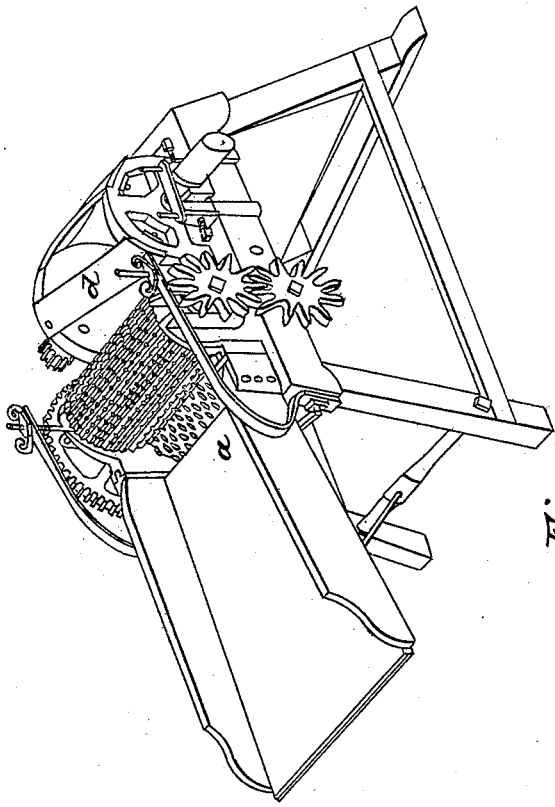
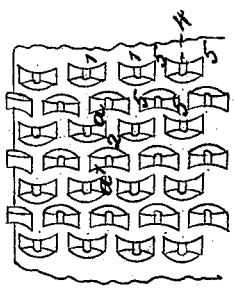
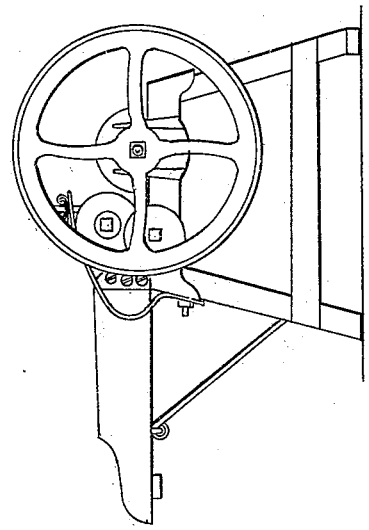
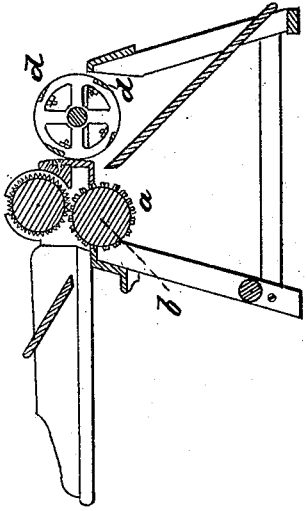

UNITED STATES PATENT OFFICE.

R. SINCLAIR, Jr., OF BALTIMORE, MARYLAND.

STRAW-CUTTER.

Specification of Letters Patent No. 20,958, dated July 20, 1858.

*To all whom it may concern:*

Be it known that I, ROBERT SINCLAIR, Jr., of Baltimore, State of Maryland, have invented an Improvement in Machines for Cutting Fodder, and that the following is a full, clear, and exact description of the principle or character which distinguishes it from all other things before known and of the usual manner of making, modifying, and using the same, reference being had to the accompanying drawings, of which—

Figure 1 is a side elevation of the fodder cutter, Fig. 2 a perspective view of the same, Fig. 3 a vertical middle longitudinal section, Fig. 4 a plan or projection of the teeth, and Fig. 5 an enlarged view of the tooth showing its convex side.

My invention consists in an improvement in the propelling and crushing cylinders of machines for cutting fodder described as follows. Under the patent granted to R. F. Maynard and myself on the 15th day of November 1853 for a straw cutter the feed roller was armed with what were denominated propelling fins arranged and operating after the manner fully set forth in that patent, the object then sought for being to secure a powerful and regular feed without crowding the straw to either side. The propulsive action of said fins I have introduced in arranging the teeth upon the roller of the present fodder cutter in combination with a peculiar feature of construction of said teeth for the purpose of effectually crushing the fodder before it passes under the knives; and by this combination I produce an imitation of the act of mastication.

The teeth $a$ $a$ which somewhat resemble the molar teeth of animals are arranged in circles on the cylinder $b$ and it will be evident on inspection of Fig. 4 that the faces 1, 2, of the teeth present zig-zag lines by which a breaking action is exerted upon the fodder at the same time that it is held firmly for favorable propulsion. The form of the tooth is substantially shown in Fig. 5; face 1 being somewhat concave and face 2 somewhat convex. Face 2 is inclined from the base to the apex of the tooth, and face 1 rises nearly straight from the base, so that the crown of the tooth presents a smaller area than its base. At the apex there is a depression 4 leaving on either side a nodular process or projection 5, as seen in Fig. 5. These latter take firm hold of the fodder and their pressure breaks up or rather divides its fibers so that when the short bits are cut off by the revolution of the knives $d$ they will be found to be thoroughly bruised and in an excellent condition to be eaten by cattle. In the drawing but one roller is shown as provided with these teeth but they may be used with advantage on both rollers. Other parts of the fodder cutter may be made according to the wishes of the constructor, my invention in this application having reference solely to the propelling and crushing cylinders.

What I claim as my invention and improvement in machines for cutting fodder, is—

The described arrangement of the teeth $a$, $a$, upon the masticating and propelling cylinder $b$, constructed with two nodular projections on either side and operating like molar teeth to propel and crush the fodder as set forth.

ROB. SINCLAIR, Jr.

Witnesses:
W. S. STETSON,
R. S. MAYNARD.